United States Patent [19]

Groothuis

[11] 4,354,186
[45] Oct. 12, 1982

[54] PICTURE DISPLAY DEVICE FOR DISPLAYING A BINARY SIGNAL GENERATED BY A PICTURE SIGNAL GENERATOR AS A BINARY INTERLACED TELEVISION PICTURE

[75] Inventor: Hermanus H. H. Groothuis, Eindhoven, Netherlands

[73] Assignee: U.S. Philips Corporation, New York, N.Y.

[21] Appl. No.: 113,884

[22] Filed: Jan. 21, 1980

[30] Foreign Application Priority Data

Feb. 13, 1979 [NL] Netherlands ......................... 7901119

[51] Int. Cl.³ .............................................. G09G 1/16
[52] U.S. Cl. .................................... 340/728; 340/793; 340/805; 340/703
[58] Field of Search ................ 340/728, 793, 805, 703

[56] References Cited

U.S. PATENT DOCUMENTS

| 3,941,926 | 3/1976 | Slobodzian et al. | 340/793 |
| 3,961,365 | 6/1976 | Payne et al. | 340/793 |
| 4,014,011 | 3/1977 | Ashkin | 340/805 |
| 4,215,414 | 7/1980 | Huelsman | 340/728 |

Primary Examiner—Marshall M. Curtis
Attorney, Agent, or Firm—Thomas A. Briody; William J. Streeter; Edward W. Goodman

[57] ABSTRACT

In an interlaced picture display device by means of which signal patterns are displayed which are uniform from field to field as obtained from character generators vertical jitter and flicker phenomena are greatly reduced by attenuating the uppermost picture element of a sequence of subjacent bright picture elements in one field in combination with attenuation of the bottommost picture element in the other field or in combination with the addition of an attenuated picture element of the bottommost picture element of one field.

3 Claims, 6 Drawing Figures

PICTURE DISPLAY DEVICE FOR DISPLAYING A BINARY SIGNAL GENERATED BY A PICTURE SIGNAL GENERATOR AS A BINARY INTERLACED TELEVISION PICTURE

BACKGROUND OF THE INVENTION

The invention relates to a picture display device for displaying a binary picture signal, generated by a picture signal generator as a two-fold interlaced television picture, this picture signal generator generating the same signal pattern, at least partly, in the two consecutive fields of a picture.

Mullard Technical Information 54, pages 3-15, discloses such a picture display device which enables the display of, for example, characters on a picture screen of a television receiver. It appears that particularly horizontal contours in the picture displayed by means of such a picture display device show a vertical jitter having the picture frequency.

SUMMARY OF THE INVENTION

It is an object of the invention to reduce the visibility of this vertical jitter to a considerable extent.

According to the invention a picture display device of the type mentioned in the opening paragraph is characterized in that the picture display device comprises a detection circuit for detecting signals corresponding to vertical brightness transients and a circuit for obtaining, in response to a signal supplied by the detection circuit and a signal of half the field frequency, at the occurrence of a vertical brightness transient, a value situated between the binary values of the picture signal in order to reduce the visibility of vertical jitter of the brightness transient versus the picture frequency in a picture displayed by the picture display device.

The invention is based on the recognition that the visibility of the vertical jitter can be reduced by avoiding maximum brightness transients in the vertical direction.

DESCRIPTION OF THE DRAWING

The invention will now be further explained with reference to the drawings. In the drawings.

DESCRIPTION OF THE PREFERRED EMBODIMENT

Figure 1:
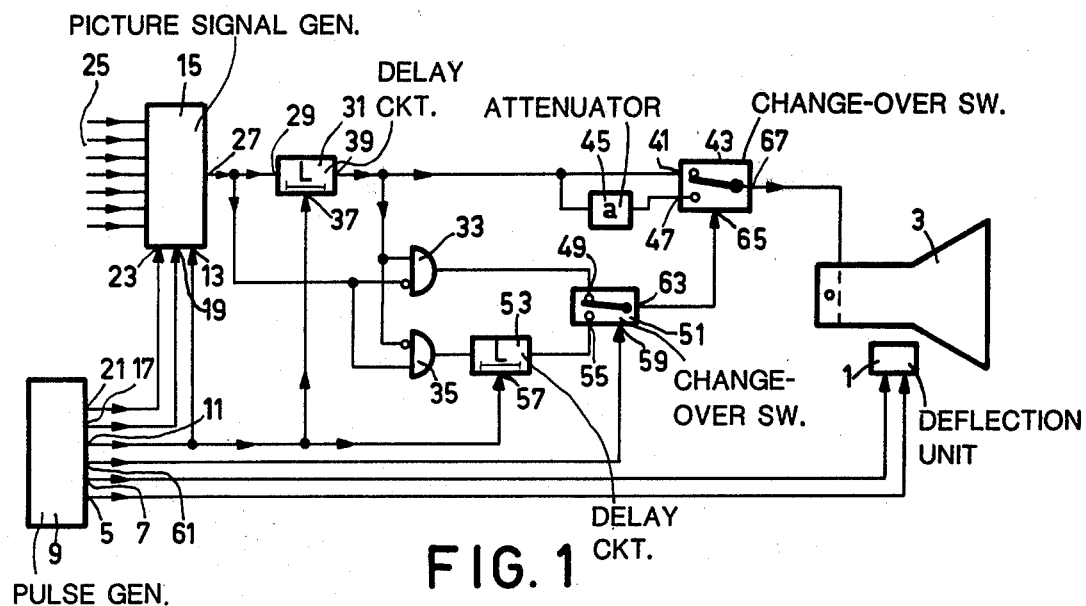
FIG. 1 illustrates by means of a block diagram a display device according to the invention.

In FIG. 1 a signal having the field frequency and a signal having the line frequency, obtained from two outputs 5, 7 of a pulse generator 9, are applied to a deflection unit 1 of a picture display tube 3. The field frequency and line frequency of, for example 50 Hz and 15625 Hz, are interrelated so that the deflection unit 1 caters for the writing of a two-fold interlaced picture by the picture display tube 3.

In addition, the pulse generator 9 applies, via an output 11, a clock signal having a frequency which is matched to the picture element frequency and may, for example be 6 MHz, to an input 13 of a picture signal generator 5, a new-character signal having a frequency of 1 MHz to an input 19 of the picture signal generator 15 via an output 17 and a new-line signal having a frequency of, for example 1562.5 Hz to an input 23 of the picture signal generator 15 via an output 21.

The picture signal generator 15 is, for example, a character signal generator having a store which can be written-in by means of a group of signals applied to a group of inputs 25. This store is read and the stored information is converted into a binary picture signal in response to the signals applied to the inputs 13, 19 and 23.

The binary picture signal appears at an output 27 of the picture signal generator. This signal has a pattern which is the same for each field of a picture. It is applied to an input 29 of a delay circuit 31, to an inverting input of an AND-gate 33 and to an input of an AND-gate 35.

The delay circuit 31 has a delay of a line period L and may be a shift register operated by the clock signal coming from the output 11 of the pulse generator and applied to an input 37 of the delay circuit 31. An output 39 thereof is connected to a further input of the AND-gate 33, to an inverting further input of the AND-gate 35, to an input 41 of a change-over switch 43 and, via an attenuator 45, to a further input 47 of the change-over switch 43.

Together with the delay circuit 31, the AND-gates 33, 35 form a detection circuit for detecting signals corresponding to vertical brightness transients. The AND-gate 33 produces an output signal at the occurrence of a 1→0 transition and the AND-gate 35 at the occurrence of a 0→1 transition. These output signals are applied directly to an input 49 of a change-over switch 51 and, via a delay circuit 53, to a further input 55 of the change-over switch 51, respectively.

The delay circuit 53 has a delay of a line period L and may be a shift register operated by the clock signal coming from the output 11 of the pulse generator 9 and applied to an input 57 of the delay circuit 54.

The change-over switch 51 has a control signal input 59 to which a signal having the picture frequency can be applied, this signal coming from an output 61 of the pulse generator 9. Therefore, the change-over switch 51 is in the shown position during one field and in the position not shown during the other field. An output 63 of the change-over switch 51 is connected to a control signal input 65 of the change-over switch 43.

In the shown position, the change-over switch 43 applies an unattenuated signal, coming from the output 39 of the delay circuit 31 to a control grid of the picture display device 3 via an output 67 while, in the position, not shown, a signal which has been attenuated by a factor of a by the attenuator 45. So this circuit has for its function to obtain the values located between the binary values of the picture signal, in response to the detection circuit and the signal of the field frequency coming from the output 61.

The attenuation occurs for a 1→0 transition in the field wherein the switch 51 is in the shown position and for a 0→1 transition in the other field. Consequently a 1→0 transition becomes a a→0 transition and a 0→1 transition becomes a 0→1 a transition at the output 67 of the change-over switch 43. The delay circuit 53 has for its object to delay at a 0→1 transition, the 1, which occurs at the output of the delay circuit 31, one line period later than this transition.

Figure 2:
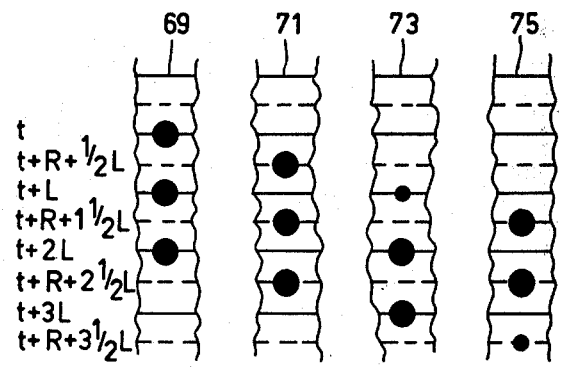
FIG. 2 shows schematically portions of a picture illustrating the operation of the display device of FIG. 1.

In FIG. 2 the reference numerals 69 and 71 denote schematically portions of a television picture such as they would occur when the signal at the output 27 of the picture signal generator were directly displayed in two consecutive fields. The reference numerals 73 and 75 indicate the same portions such as they are displayed in corresponding fields with the signal at the output 67 of the change-over switch 43. In one field, at 73, the picture elements (t+L, t+2L and t+3L) are delayed one line period with respect to the picture elements at 69 (t, t+L and t+2L) in response to the delay circuit 31, and the topmost bright picture element (t+L) is attenuated relative to the picture element (t) at 69. In the other field, at 75, the picture element (t+R+1½L, t+R+2½L and t+R+3½L) are delayed one line period relative to the picture elements 71 (t+R+½L) (t+R+1½L and t+R+2½L), and the bottom-most picture element (t+R+3½L) is attenuated relative to the picture element (t+R+2½L) at 71.

When a is chosen so that the brightness of the attenuated picture elements (t+L) and (t+R+3½L) is approximately half the brightness of the other picture elements (t+R+½L to t+3L), the impression is received that no flicker and jitter phenomena of brightness transition will occur, as would be the case when the signals at the output 27 of the picture signal generators 15 were displayed in accordance with 69 and 71.

Figure 3:
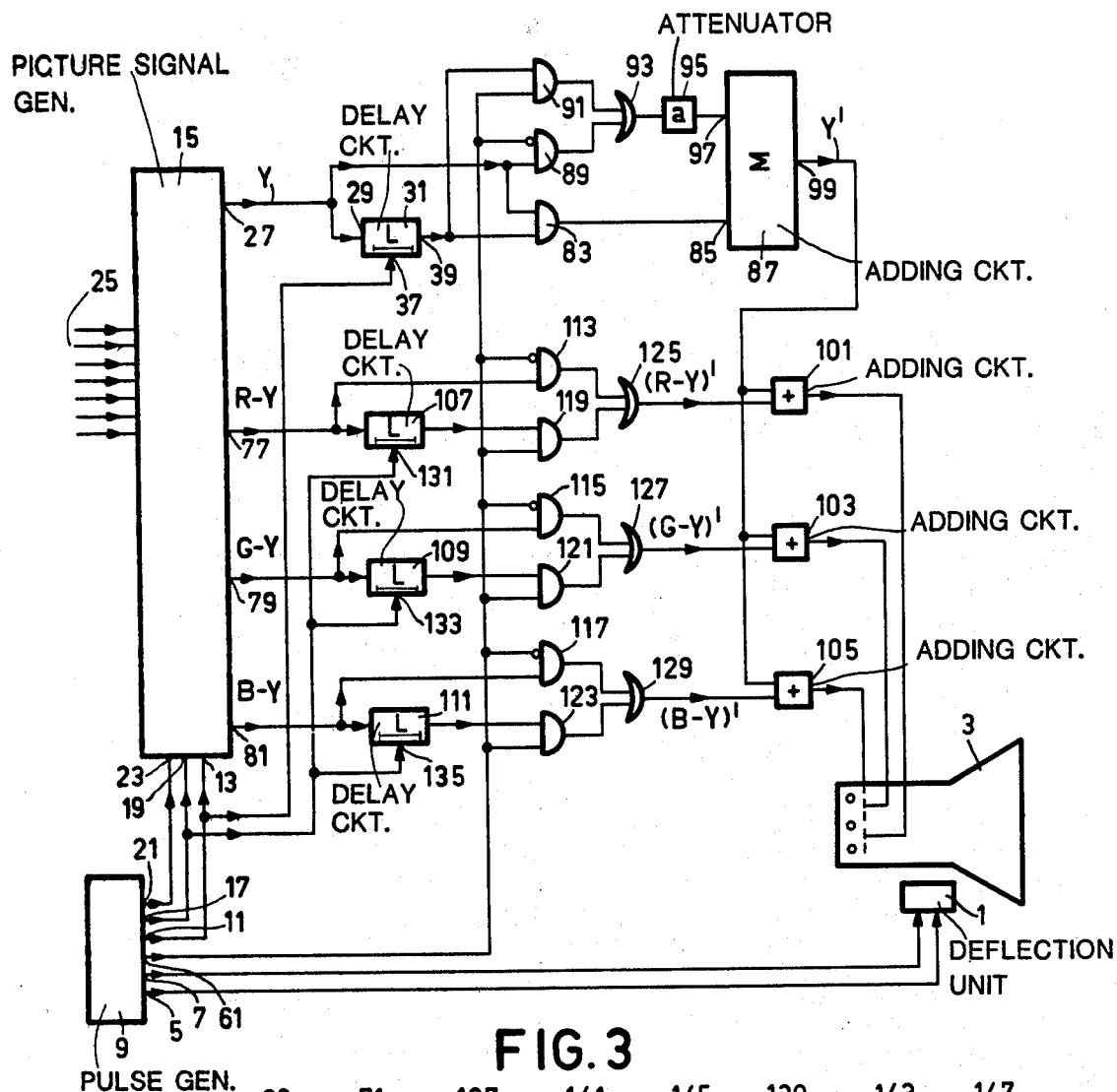
FIG. 3 illustrates by means of a block diagram another construction of a display device according to the invention.

Corresponding elements in FIG. 3 have been given the same reference numerals as in FIG. 1.

The picture signal generator 15 does not only supply a luminance signal Y, which corresponds to the picture signal of FIG. 1 at the output 27, but also colour difference signals (R−Y), (G−Y), and (B−Y), which are also binary signals, at three outputs 77, 79 and 81.

The suppression of vertical jitters and flicker phenomena is effected in the luminance signal Y.

The input and output signal of the delay circuit 31 is applied to an AND-gate 83 which forms, together with the delay circuit 31, a detection circuit for detecting signals which correspond to vertical brightness transients. The output signal of the AND-gate 83 is applied to input 85 of an adding circuit 87. In this output signal the signal which corresponds to the topmost bright picture element of a sequence of subjacent bright picture elements is suppressed, that is to say the 1 is suppressed at a 0→1 transition. At the 1→0 transition at the bottom of the subjacent bright picture elements, the detection circuit does not have any influence on the 1 of that transition.

The picture signal at the input 29 of the delay circuit 31 is further applied to an input of an AND-gate 89 and the signal at the output 39 of the delay circuit 31 is applied to an input of an AND-gate 91. The further inputs of the AND-gates 89 and 91 are controlled by an inverted and a non-inverted signal, respectively, of half the field frequency, obtained from the output 61 of the pulse generator 9. The outputs of the AND-gates 89, 91 are connected to the inputs of an OR-gate 93, the output of which is connected to an input 97 of the adding circuit 87 via an attenuator 95. Consequently, this input 97 receives in one field a delayed picture signal, which is attenuated by a factor of a and in the other field a non-delayed picture signal which is attenuated by a factor of a. The AND-gates 89 and 91, the OR-gate 93, the attenuator 95 and the adding circuit 87 form a circuit to obtain intermediate values between binary values in response to the detection circuit 31, 83 and the signal of half the field frequency.

Figure 4:
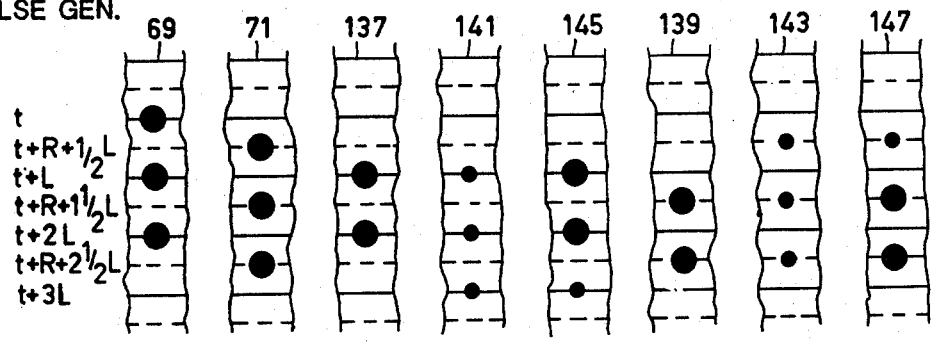
FIG. 4 shows schematically portions of a picture from which the effect of a portion of the circuit of FIG. 3 on the display of a luminance signal is apparent.

A corrected luminance signal Y′, by means of which a substantially vertical jitter-free and flicker-free picture is obtained on display, as will be explained hereinafter with reference to FIG. 4, is now obtained from an output 99 of the adding circuit 87. This corrected luminance signal Y′ is applied to an input of three adding circuits 101, 103, 105, the other inputs of which receive in one field a delayed and in the other field a non-delayed colour difference signal (R−Y) and (G−Y), (B−Y), respectively, in the form of a corrected colour difference signal (R−Y)′, and (G−Y)′, (B−Y)′, respectively, and the outputs of which control the control grid of the picture display tube 3.

The colour difference signals (R−Y) and (G−Y), and (B−Y), respectively, coming from the outputs 77, 79, 81 of the picture signal generator 15, are applied to an input of delay circuit 107 and 109 and 111, respectively, and to the input of AND-gates 113, 115 and 117, respectively. An output of the delay circuits 107, 109 and 111, respectively, is connected to an input of AND-gates 119, 121 and 123, respectively. The other inputs of the AND-gates 119, 121, 123 receive a signal of half the field frequency from the output 61 of the pulse generator 9. The other inputs of the AND-gates 113, 115, 117 receive this signal in the inverted form.

The outputs of the AND-gates 113, 119 are connected to inputs of an OR-gate 125, the outputs of the AND-gates 115, 121 to inputs of an OR-gate 127 and the outputs of the AND-gates 117, 123 to inputs of an OR-gate 129. The OR-gates 125, 127, 129 supply the above-mentioned corrected colour difference signals (R−Y)′ and (G−Y)′ (B−Y)′, respectively.

The delay circuits 107, 109, 111 have a time delay of a line period (L) and may be formed by a shift register, which is controlled in response to a 1 MHz clock signal applied to inputs 131, 133, 135. This signal is obtained from the output 17 of the pulse generator 9. The frequency of this signal has been chosen below the frequency of the clock signal for the delay circuit 31, as the delay circuits 107, 109, 111 require less elements in view of the smaller bandwidth necessary for the colour difference signals.

It is, alternatively, possible to assemble the signals (R−Y), (G−Y), (B−Y) and Y first into R, G and B signals and to use thereafter three times a correction circuit as used for the Y-signal. This requires three delay circuits having a large number of elements.

FIG. 4 shows schematically at 69, as in FIG. 2, a number of picture elements occurring in one field at instants t, t+L, t+2L if the picture signal were directly displayed at the output 27. The same picture elements occur, as shown schematically at 71, in the other field at instant t+R+½L, t+R+1½, t+R+2½L.

The output signal of the AND-gate 83 at the input 85 of the adding circuit 87 would occur in one field as shown schematically at 137, at the instants t+L, t+2L if this signal were displayed directly, and in the other field as shown schematically at 139 at the instants t+R+1½L, t+R+2½L. If the signal at the input 97 of the adding circuit were displayed directly, and would occur attenuated as shown schematically at 141, at the instants t+L, t+2L, t+3L and would occur attenuated in the other field as shown schematically at 143 at the instants t+R+½L, t+R+1½L, t+R+2½L. The signal at the output 99 of the adding circuit would be displayed in one field, as shown schematically at 145 and in the other field as shown schematically at 147. The uppermost picture element of a sequence of bright subjacent picture elements is therefore again attenuated, and also the bottommost picture element, as a result of which vertical jitter and flicker phenomena are greatly reduced. The choice of the factor a is done on the same fundamental considerations as mentioned in the description of FIGS. 1 and 2; it appears that this factor may be approximately 0.7 to 0.9 when the present display tubes are used.

Good results are also obtained with the circuit of FIG. 3 when character rounding is used in the picture signal generator when the fields are interchanged at rounding, that is to say the rounding as customary for one field is now affected in the other field and the rounding as customary for the other field is now used in the first-mentioned field. Generally, this can be realized in a simple manner by applying the signal from the output 61 of the pulse generator 9, which signal then also controls the character rounding in the picture signal generator 15, to the picture signal generator 15 in a suitable phase.

Figure 5:
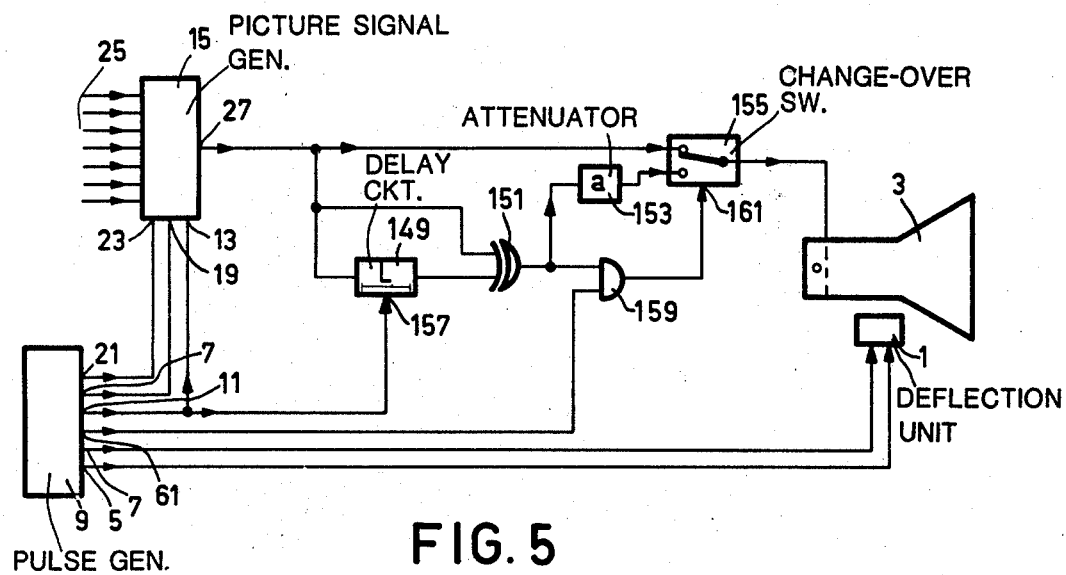
FIG. 5 illustrates by means of a block diagram a still further construction of a display device according to the invention and FIG. 6 shows schematically portions of a picture from which the operation of the display device of FIG. 4 is apparent.

Corresponding elements in FIG. 5 have been given the same reference numerals as in FIG. 1. The signal at the output 27 of the picture signal generator 15 is applied to a detection circuit for vertical brightness transients, this detection circuit being formed by a delay circuit 149 having a time delay of one line period L and an EXCLUSIVE-OR-gate 151 having inputs connected to an input and to an output of the delay circuit 149.

The output signal of this EXCLUSIVE-OR-gate 151 is applied via an amplitude-determining circuit 153 to an input of a change-over switch 155, a further input of which is connected to the output 27 of the picture signal generator 15 and the output to a control electrode of the picture display tube 3.

The delay circuit 149 is controlled by means of an input 157 by the signal received from the output 11 of the pulse generator 9.

The EXCLUSIVE-OR-gate 151 supplies at its output a signal which is logic 1 only if there is a vertical 0→1 or 1→0 transition in the signal at the output 27 of the picture signal generator 15. This signal is applied in one of the two fields to a control signal input 161 of the change-over switch 155 via an AND-gate 159.

The change-over switch 155 is usually in the position shown in the drawing and then passes the output signal of the picture signal generator 15 on to the picture display tube 3. Only at the occurrence of the 0 of a 0→1 transition and of the 1 of a 1→0 transition, the change-over switch 155 assumes the other position and a signal having an amplitude a determined by the amplitude-determining circuit 153 is displayed by the picture display tube 3. The AND-gate 159 forms here, in combination with the amplitude-determining circuit 153 and the change-over switch 155, the circuit which has for its object to obtain the value located between the binary values of the picture signal.

Figure 6:
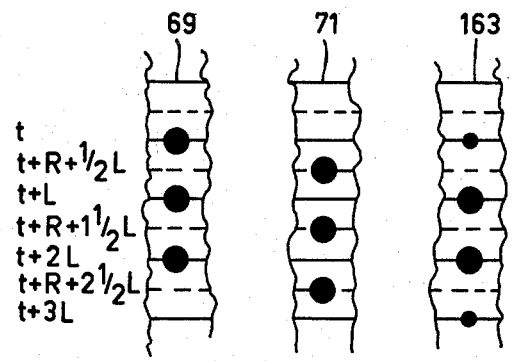

The effect of this change-over is apparent from FIG. 6, wherein the signals at the output 27 would display a partial picture 69 and 71, respectively, in the two consecutive fields, the partial picture 71 of which is not influenced by the detection circuit in response to the action of AND-gate 159. The partial picture 69 passes into a displayed partial picture 163 wherein the brightness is reduced at the instant t at a 0→1 transition, and a picture element of a reduced brightness is added at the instant t+3L at a 1→0 transition.

What is claimed is:

1. A picture display device for displaying a binary picture signal generated by a picture signal generator as a twofold interlaced television picture, this picture signal generator generating the same signal pattern in the two consecutive fields of a picture, characterized in that the picture display device comprises a detection circuit for detecting signals corresponding to vertical brightness transients between lines in each field and a circuit for attenuating, in response to a signal supplied by the detection circuit and to a signal of half the field frequency, the brighter picture signal at the occurrence of said vertical brightness transients, whereby the value of the attenuated picture signal is located between the binary values of the two relevant picture signals thereby reducing the visibility of vertical jitter of the brightness transients having the picture frequency in a picture displayed by the picture display device.

2. A picture display device as claimed in claim 1, characterized in that the detection circuit is a circuit for detecting signals corresponding to a maximum brightness in subjacent elements of two consecutive lines of a field and that the attenuating circuit is arranged to attenuate the picture signal at the upper edge of a contour with a brightness which increases in the downwards direction in one field and at the bottom of a contour with a brightness which decreases in the downwards direction in the other field.

3. A picture display device as claimed in claim 1, characterized in that the detection circuit comprises a delay circuit having a time delay of one line period, the input and the output of which are coupled to a gate circuit having an EXCLUSIVE-OR-function whereas the attenuating circuit is inoperative in one of the fields in response to the signal of half the field frequency.

* * * * *